(12) United States Patent
DeLucia

(10) Patent No.: US 6,260,858 B1
(45) Date of Patent: Jul. 17, 2001

(54) INSULATED HEAT SHRINK TOOL HOLDER

(75) Inventor: Victor DeLucia, North Hollywood, CA (US)

(73) Assignee: Induction Technologies, Santa Monica, CA (US)

(*) Notice: Subject to any disclaimer, the term of this patent is extended or adjusted under 35 U.S.C. 154(b) by 0 days.

(21) Appl. No.: 09/481,946

(22) Filed: Jan. 12, 2000

(51) Int. Cl.[7] .......................... B23B 31/117; B23P 11/02; F16B 4/00

(52) U.S. Cl. ........................... 279/102; 29/447; 403/273; 408/226; 409/234

(58) Field of Search ............................. 279/102; 29/447; 409/234; 408/226; 403/273; 76/108.1, 108.6

(56) References Cited

U.S. PATENT DOCUMENTS

| | | |
|---|---|---|
| 2,942,891 | 6/1960 | Zale . |
| 3,382,563 * | 5/1968 | Barroil et al. ........................ 29/447 |
| 4,499,646 * | 2/1985 | Allor et al. ............................ 29/447 |
| 4,516,787 | 5/1985 | Venable . |
| 4,602,411 * | 7/1986 | Brown .................................... 29/447 |
| 5,140,739 | 8/1992 | Yamaguchi et al. . |
| 5,267,384 | 12/1993 | Teeslink . |
| 5,277,435 | 1/1994 | Kramer et al. . |
| 5,280,671 | 1/1994 | Marquart . |
| 5,311,654 | 5/1994 | Cook . |
| 5,582,494 | 12/1996 | Cook . |
| 5,979,912 * | 11/1999 | Cook ..................................... 279/102 |
| 6,035,512 * | 3/2000 | Cook ..................................... 29/447 |

* cited by examiner

*Primary Examiner*—Steven C. Bishop
(74) *Attorney, Agent, or Firm*—Fulwider Patton Lee & Utecht, LLP

(57) ABSTRACT

An improved insulated, heat shrink tool system and method of assembly, which utilizes an insulating sleeve within the internal opening of a heat shrink tool holder wherein the insulating sleeve has a thermal conductivity less than that of the tool holder. In use the tool holder, is heated by means of an induction heating system, or hot air. As the tool holder is heated it expands outwardly thereby enlarging or increasing the internal diameter of the holder. The internal section of the holder is lined with an insulating sleeve prepared from titanium or a titanium alloy having a thermal conductivity less than that of the holder. The insulating sleeve is brazed to the inner wall of the holder so that the expansion of the holder during heating will result in a simultaneous, and equal expansion of the inner diameter of the insulating sleeve. The shank of a cutting tool is than inserted within the insulating sleeve of the holder and the holder is allowed to cool. As the holder cools it exerts a uniform pressure on the tool shank positioned within the insulating sleeve resulting in a tight, rigid concentric coupling of the cutting tool and the chuck. To remove the tool the heating process is repeated resulting in the expansion of the tool holder and insulating sleeve a sufficient distance to allow the tool to be removed. Due to the incorporation of the insulating sleeve less heat is transferred to the tool during this process.

20 Claims, 2 Drawing Sheets

INSULATED HEAT SHRINK TOOL HOLDER

BACKGROUND OF INVENTION

1. Field of Invention

This invention relates to heat shrink tool assemblies wherein a work piece such as a drill bit or cutting tool is positioned with a tool chuck by means of heating the chuck thereby causing it to expand whereby the tool shank is inserted within the chuck and held in place by the chuck when it has cooled and shrunk around the tool shank.

2. Description of Prior Art

It is known in the art to utilize heat shrink tool assemblies in high speed industrial applications. The prior designs have utilized unitary chucks having an inner diameter slightly smaller than the exterior diameter of the shank of the cutting tool or other work piece. During use the tool chuck is heated, typically by means of induction heating, causing the chuck to expand a sufficient amount to allow the tool shank to be inserted within the chuck. The tool is then allowed to cool during which the thermal contraction of the chuck exerts a uniform pressure on the tool shank, allowing the chuck to shrink down around the tool shank to securely lock or hold the shank in place. It has long been recognized that these types of heat shrink tool assemblies provide an improvement over standard milling chucks or collet chucks.

Various prior approaches to heat shrink tool assemblies are shown in Zale, U.S. Pat. No. 2,942,891; Yamaguchi, et al., U.S. Pat. No. 5,140,739; Teeslink, U.S. Pat. No. 5,267,384, Marquert; U.S. Pat. No. 5,280,671; Krämer, et al., U.S. Pat. No. 5,277,435; Cook, U.S. Pat. No. 5,311,654 and Cook, U.S. Pat. No. 5,582,494.

These prior devices all suffer from the same shortcoming when it is desired to remove the tool from the chuck. In order to remove the tool the chuck is re-heated to expand the opening. During the heating process the chuck transfers heat to the tool shank itself. The expanding tool shank can create problems with the removal of the tool from the chuck, even resulting in the tool remaining grasped by the chuck and requiring a significant force to remove the tool.

A need therefore exists for a heat shrink tool assembly which allows for the easy and quick removal of the tool from the chuck.

SUMMARY OF THE INVENTION

The present invention comprises a new insulated, shrink fit tool system and method of assembly, which utilizes an insulating sleeve within the internal opening of a heat shrink tool holder wherein the insulating sleeve is made of chemically pure titanium or a titanium alloy having a thermal conductivity of 4 to 5 times less than that of the tool holder. In use the tool holder, preferably constructed from nickel-chromium steel, is heated by means of an induction heating system. As the tool holder is heated it expands outwardly thereby enlarging or increasing the internal diameter of the holder. The internal section of the holder is lined with an insulating sleeve prepared from titanium or a titanium alloy having a thermal conductivity less than the holder. The insulating sleeve is brazed, or otherwise joined to the inner wall of the holder so that the expansion of the holder during heating will result in a simultaneous, and equal expansion of the inner diameter of the insulating sleeve. The shank of a cutting tool is than inserted within the thermal insulating sleeve of the holder and the holder is allowed to cool. As the holder cools it exerts a uniform pressure on the tool shank positioned within the thermal insulating sleeve resulting in a tight, uniform and rigid concentric coupling of the cutting tool and chuck.

When it is desired to remove the tool from the holder the holder is again heated by induction heating. The holder, including the insulating sleeve, expands outwardly thereby allowing the tool shank to be pulled from or otherwise removed from the tool holder. Due to its lower thermal conductivity the insulating sleeve does not transfer the heat to the tool which allows for the removal time to be shortened and also allows for the removal of the tool by the machine operator.

The new insulated, heat shrink tool holder of the subject invention is manufactured by means of preparing a thermal insulating sleeve out of chemically pure titanium or 6-4 titanium alloy, wherein the external diameter of the sleeve is approximately 0.001" inches less than the internal diameter of the tool holder. The thermal insulating sleeve is inserted within the tool holder and the tool holder and sleeve are then joined together by means of explosive bonding or by brazing. Thereafter, the thermal insulating sleeve will expand or contract in unison with the tool holder as the tool holder is heated or cooled.

DETAILED DESCRIPTION

Figure 1:
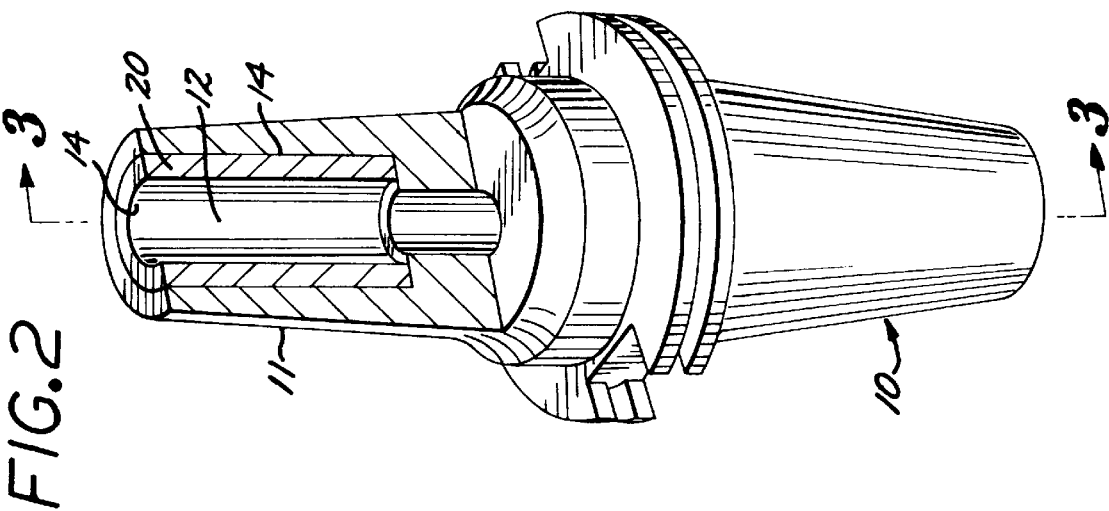
FIG. 1 is an illustration of a prior art design for a heat shrink tool assembly.

In FIG. 1, a prior art heat shrink tool assembly design is disclosed which is particularly suited to eliminate eccentricity in the mounting of a cutting tool 4 within a tool holder 1. In this prior embodiment, a central aperture 2 is formed in tool holder 1, preferably formed to be approximately one to three ten-thousandths (0.0001–0.0003) of an inch less in diameter than the shank portion 3 of the cutting tool 4. In order to insert the cutting tool 4 within the tool holder 1, the tool holder portion 5 of the tool holder 1 is externally heated. Due to the thermal expansion characteristics of the tool holder 1 the application of heat to the tool holder 1 causes the holder to expand resulting in the central aperture 2 enlarging or increasing in diameter an amount sufficient to allow the shank portion 3 to be inserted therein. When the tool shank 3 is inserted a sufficient distance within the aperture 2, the external application of heat is discontinued and the tool holder 1 is allowed to cool back to ambient temperature wherein thermal contraction causes the aperture 2 to form a rigid bond between the cool holder 1 and the shank portion 3 of the tool 4. As such, the tool 4 is rigidly maintained within the tool holder 10 in a concentric fashion for high tolerance machining applications.

Figure 2:
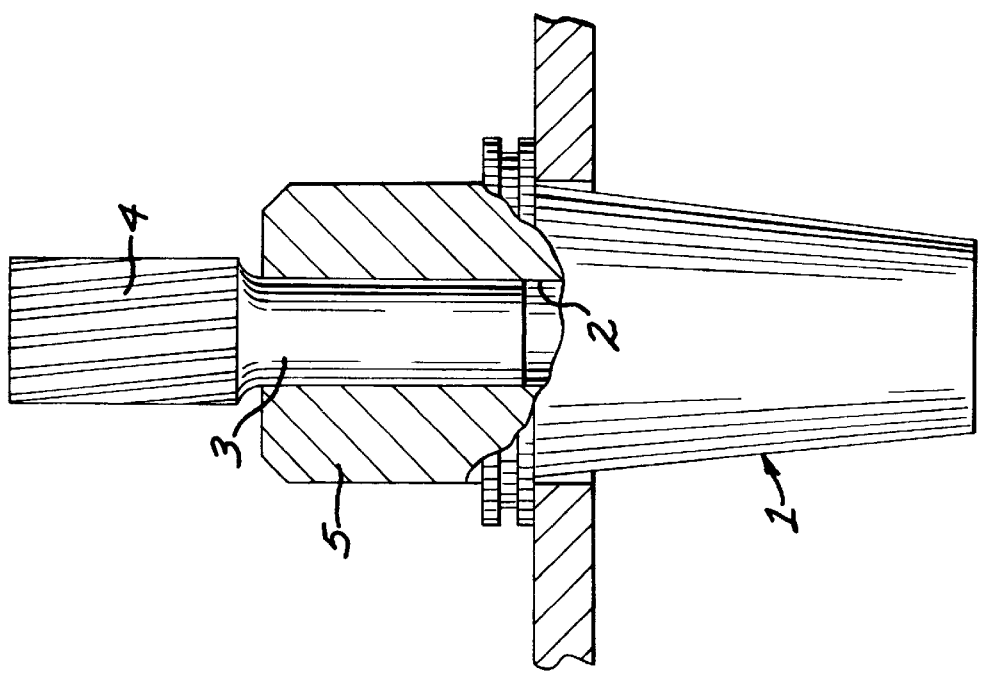
FIG. 2 is a partial cut-away perspective view of the subject invention.
Figure 3:
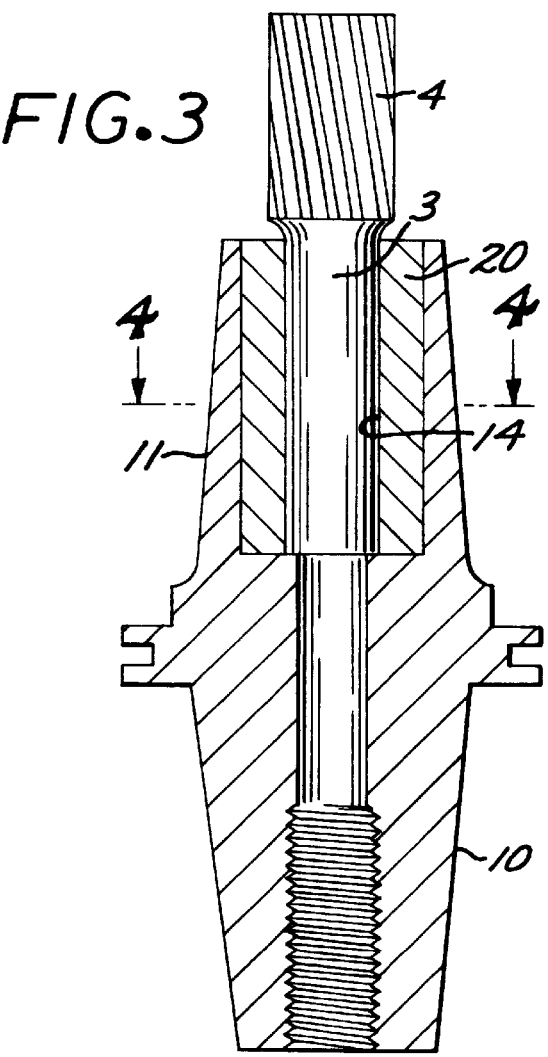
FIG. 3 is a cross-sectional side view of the subject invention.
Figure 4:
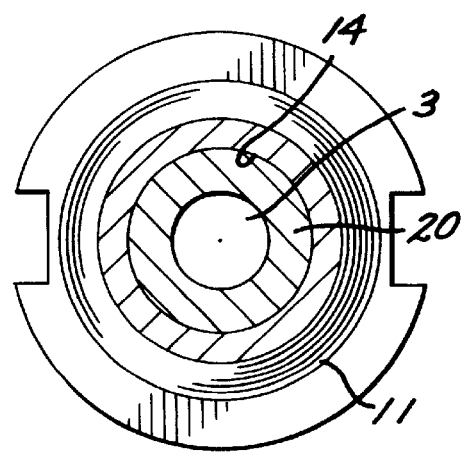
FIG. 4 is a top cross-sectional view taken along line 4—4 of FIG. 3.

As discussed, such prior art designs suffer from the transfer of heat from the tool chuck or tool holder to the tool itself. The present invention which is shown in FIG. 2–FIG. 4, eliminates this problem by means of the inclusion of an insulating sleeve 20 within the tool holder. In a preferred embodiment tool holder 10 is constructed from nickel-chromium steel having a thermal coefficient of expansion of $11 \times 10^{-6}$, or other suitable material known to those skilled in the art. Insulating sleeve 20 is provided within aperture 12 in tool holder portion 11 which extends axially along the center of tool holder 10. Insulating sleeve 20 is preferably manufactured out of chemically pure titanium alloy or 6-4 titanium alloy. Other materials having a lower thermal conductivity, such as ceramics, Invar and the like may be also used. In a preferred embodiment, insulating sleeve 20 is approximately 0.032–0.70 inches thick. Depending upon the specific application, the sleeve 20 may vary in thickness between 0.5 and 0.125 inches. As shown in FIG. 2, insulating sleeve 20 extends the length of the cylindrical opening 12 in tool holder portion 11.

Insulating sleeve 20 is joined with the interior walls 14 of tool holder 10 by means of explosive bonding, brazing or other means known to those skilled in the art. In a preferred method of assembly insulating sleeve 20 is joined to the tool chuck using explosive bonding. In a alternate preferred method of assembly insulating sleeve 20 is brazed to the interior walls 14 of holder 10 using a silver alloy and heating the combined sleeve and holder in a vacuum heating chamber to 1850° F. It is recognized by those skilled in the art that if the insulating sleeve 20 is constructed from ceramics or other materials such as Invar, different methods of assembly would be utilized.

During use the tool holder 10 is heated, preferably to a temperature of 650° F. which will cause the tool holder to expand a sufficient distance, typically 0.0003 to 0.0012 inches to allow the tool shank to be inserted within the insulating sleeve. By virtue of being joined to the interior walls 14 of tool holder 10, insulating sleeve 20 expands outwardly as the tool holder is heated. This results in an expansion of the inside diameter of the sleeve opening 12 a sufficient amount to allow insertion of the tool shank 3. It is known to heat the tool holder 10 by means such as induction heating in a manner known to those skilled in the art.

Once the tool 4 has been inserted within the insulated tool holder 10 the heat is removed and the tool holder 10 is allowed to cool. As the tool holder 10 cools and contracts to its original configuration the insulating sleeve 20 is compressed about the tool shank 3 applying a uniform pressure on the tool shank 3 which locks or holds the tool in position. Due to the uniform application of pressure the tool 4 is held in a more highly concentric alignment with the tool holder 10.

To remove the tool, heat is again applied to the tool holder 10 causing the tool holder to expand outwardly. As the tool holder 10 expands, insulating sleeve 20 again expands outwardly allowing the tool shank 3 to be withdrawn from within the insulating sleeve opening 12. However, due to the differences in the thermal conductivity for the steel tool holder 10 and the insulating sleeve 20, heat is not transferred from the tool holder 10 to the tool 4 itself during this process. It allows for the easier removal of the tool 4 from the tool holder 10.

Although for purposes of description certain materials, sizes and configurations have been described herein, those skilled in the art will recognize that various modifications to the same may be made without departing from the spirit of the present invention and the invention is not to be limited to the embodiments disclosed herein but is to be accorded the full scope of the claims provided herein.

What is claimed is:

1. An insulated, heat shrink tool holder comprising:
   a tool holder formed of a material having a first thermal conductivity, said tool holding including a central aperture extending axially therein,
   an insulating sleeve, formed of a material having a second thermal conductivity, said insulating sleeve being positioned within said central aperture and joined to said tool holder, whereby the application of heat to said tool holder will cause it to expand outwardly thereby expanding said insulating sleeve and the removal of heat will cause said tool holder and insulating sleeve to uniformly contract.

2. The insulated, heat shrink tool holder of claim 1, wherein said second thermal conductivity is at least 3 times less than said first thermal conductivity.

3. The insulated, heat shrink tool holder of claim 1, wherein the first thermal conductivity is approximately 16.5 BTU/FTHR/° F. at 400° F.

4. The insulating, heat shrink tool holder of claim 1, wherein the second thermal conductivity is approximately 5.3 BTU/FTHR/° F. at 400° F.

5. The insulated, heat shrink tool holder of claim 1, wherein said insulating sleeve is formed from chemically pure titanium alloy.

6. The insulated, heat shrink tool holder of claim 1, wherein said insulating sleeve is formed from 6-4 titanium alloy.

7. The insulated heat shrink tool holder of claim 1, wherein said insulting sleeve is formed from sintered titanium.

8. The insulated, heat shrink tool holder of claim 1 wherein said insulated sleeve is between 0.05 and 0.125 inches thick.

9. The insulated, heat shrink tool holder of claim 1, wherein said insulating sleeve is joined to said tool holder by means of brazing.

10. The insulated, heat shrink tool holder of claim 1, wherein said insulating sleeve is joined to said tool holder by means of explosive bonding.

11. An insulated, heat shrink tool holder designed for holding the shank of a cutting tool comprising:
    a tool holder formed of a material having a first thermal conductivity said tool holding including a central aperture extending axially therein,
    an insulating sleeve, formed of a material having a second thermal conductivity said insulating sleeve having an inner diameter approximately 0.0003 to 0012 inches less than the diameter of the tool shank, said sleeve being positioned within said central aperture and joined to said tool holder, whereby the application of heat to said tool holder will cause it to expand outwardly thereby expanding said insulating sleeve and the removal of heat will cause said tool holder and insulating sleeve to uniformly contract.

12. The insulated, heat shrink tool holder of claim 11, wherein said second thermal conductivity is at least 3 times less than said first thermal conductivity.

13. The insulated, heat shrink tool holder of claim 11, wherein the first thermal conductivity is approximately 16.5 BTU/FTHR/° F. at 400° F.

14. The insulating, heat shrink tool holder of claim 11, wherein the second conductivity is approximately 5.3 BTU/FTHR/° F. at 400° F.

15. The insulated, heat shrink tool holder of claim 11, wherein said insulating sleeve is formed from chemically pure titanium alloy.

16. The insulated, heat shrink tool holder of claim 11, wherein said insulating sleeve is formed from 6-4 titanium alloy.

17. The insulated heat shrink tool holder of claim 11, wherein said insulating sleeve is formed from sintered titanium.

18. The insulated, heat shrink tool holder of claim 11, wherein said insulated sleeve is between 0.032 and 0.070 inches thick.

19. The insulated, heat shrink tool holder of claim 11, wherein said insulating sleeve is joined to said tool holder by means of explosive bonding.

20. The insulated, heat shrink tool holder of claim 11, wherein said insulating sleeve is joined to said tool holder by means of brazing.

* * * * *